United States Patent
Bauer et al.

(10) Patent No.: US 7,383,117 B2
(45) Date of Patent: Jun. 3, 2008

(54) METHOD FOR OPTIMIZING A VALVE-LIFT CHANGEOVER ON SPARK-IGNITION ENGINES

(75) Inventors: Erwin Bauer, Lappersdorf (DE); Dietmar Ellmer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/546,497

(22) Filed: Oct. 11, 2006

(65) Prior Publication Data

US 2007/0083320 A1 Apr. 12, 2007

(30) Foreign Application Priority Data

Oct. 11, 2005 (DE) .................... 10 2005 048 704

(51) Int. Cl.
*G06F 19/00* (2006.01)
*F01L 1/34* (2006.01)

(52) U.S. Cl. .................... 701/103; 701/110; 123/90.15

(58) Field of Classification Search ........ 701/101–105, 701/110, 114; 123/492, 146, 674, 90.15; 180/65.2, 65.6; 73/117.2, 118
See application file for complete search history.

(56) References Cited

U.S. PATENT DOCUMENTS

| 4,860,863 | A | * | 8/1989 | Hayashi ........................ 477/39 |
| 5,000,280 | A | * | 3/1991 | Wazaki et al. ............... 180/197 |
| 5,239,963 | A | * | 8/1993 | Ikebe et al. .................. 477/102 |
| 5,413,078 | A | * | 5/1995 | Mitsunaga et al. ......... 123/492 |
| 5,638,677 | A | * | 6/1997 | Hosono et al. ............... 60/431 |
| 5,782,711 | A | * | 7/1998 | Tsutsui et al. .............. 477/156 |
| 5,878,733 | A | * | 3/1999 | Kato et al. .................. 123/681 |
| 5,884,613 | A | * | 3/1999 | Kitamura et al. ........... 123/696 |
| 5,911,682 | A | * | 6/1999 | Kato et al. .................... 60/276 |
| 6,029,641 | A | * | 2/2000 | Suzuki et al. ............... 123/673 |
| 6,883,626 | B2 | * | 4/2005 | Aoki et al. ................. 180/65.2 |
| 6,980,901 | B2 | * | 12/2005 | Hartmann et al. .......... 701/101 |
| 2004/0173172 | A1 | | 9/2004 | Harada et al. |

FOREIGN PATENT DOCUMENTS

DE      10 2004 021 183 A1      11/2005

OTHER PUBLICATIONS

Richard Van Basshuyen, Fred Schäfer, "Handbuch Verbrennungsmotor: Grundlagen, Komponenten, Systeme, Perspektiven", Vieweg, 2005, pp. 403-433.

* cited by examiner

*Primary Examiner*—Willis R. Wolfe, Jr.
*Assistant Examiner*—Johnny H. Hoang

(57) ABSTRACT

This invention describes a method for optimizing a valve-lift changeover on spark-ignition engines with lambda control. On the basis of the evaluation of an acceleration characteristic and a lambda characteristic during the valve-lift changeover, it is determined whether cylinder charging errors and/or torque errors that require correction are present in the spark-ignition engine.

5 Claims, 1 Drawing Sheet

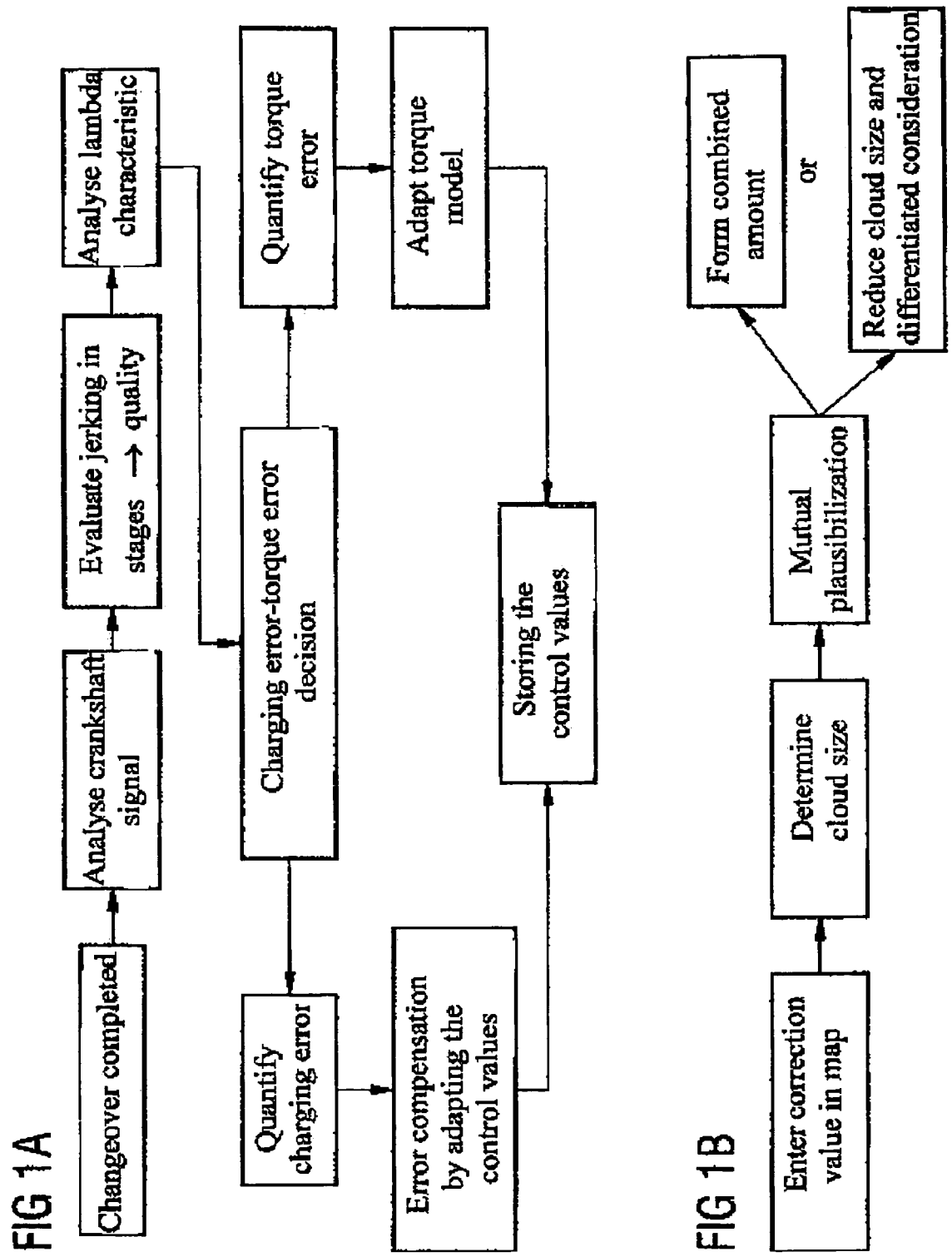

METHOD FOR OPTIMIZING A VALVE-LIFT CHANGEOVER ON SPARK-IGNITION ENGINES

CROSS REFERENCE TO RELATED APPLICATIONS

This claims the benefits of German Patent application No. 10 2005 048 704.1 filed Oct. 11, 2005. All of the applications are incorporated by reference herein in their entirety.

FIELD OF THE INVENTION

This invention relates to a method for optimizing a valve-lift changeover on spark-ignition engines with lambda control.

BACKGROUND OF THE INVENTION

The principle of valve-lift changeover on internal combustion engines is known from the prior art. Thus, systems such as Vario-Cam-Plus from Porsche have already been in series production for several years (see also "Handbuch Verbrennungsmotor", Publisher: van Basshuysen/Schäfer, Vieweg Verlag, $1^{st}$ edition 2002, chapter 10.4

The problem with this technology is still the lift changeover process itself. Difficulties arise with respect to the torque neutrality of the internal combustion engine precisely at the changeover from a small to a large valve lift. Compared with this, the changeover from a large to a small valve lift can preferably take place in the overrun fuel cut-off phases and is therefore inclined to be uncritical with regard to torque neutrality.

The valve-lift changeover frequently leads to jerky running of the motor vehicle. The reason for this is in the barely unavoidable inaccuracies in the model of the degree of aspiration or delivery (manifold model). These models calculate, in the engine management system, the air mass supplied to each cylinder. From this, the amount of fuel to be injected to maintain a specific air/fuel ratio (lambda) is calculated. The amount of fuel in turn determines the amount of engine torque produced for the particular combustion cycle.

A separate model is stored in the engine management system for each valve-lift configuration of the internal combustion engine. The model data is stored in maps formed from sampling points. Because the data content of these maps is usually identical for a variety of vehicles, for example from series production, the system individuality plays a considerable role in this case. Even small manufacturing tolerances can mean that two systems that are supposedly the same behave differently.

A measure of the quality of the valve-lift changeover is obtained by a comparison of the torque in both valve-lift configurations, i.e. directly before and directly after the valve-lift changeover. The torque for both valve lifts before and after the valve-lift changeover should be as equal as possible. Even small errors in the model calculation can lead to differences in torque and therefore to jerky running of the vehicle during the valve-lift changeover. Even though the cylinder charging models are usually adjusted by existing sensors, such as inlet manifold pressure sensors, air mass meters etc, these components are themselves subject to tolerances and therefore small inaccuracies cannot be ruled out.

This brings us to the cost-accuracy problem. At a realistic price it is possible to develop and manufacture a sensor with only a limited accuracy. A further difficulty is that the combustion behavior of the spark-ignition engine will in all probability alter due to the valve-lift changeover. This is to be expected mainly with ported injectors due to the changed flow cross section and changed flow conditions at the valve. A particular problem then arises if a change in the combustion process also takes place during the valve-lift changeover. This, for example, will be a change from a spark-ignition engine type combustion to a controlled spontaneous ignition.

In principle, the models can be translated in the engine management system with any required accuracy. The disadvantage, however, is the rapidly increasing complexity of the data processing sequences that arise when all the influencing parameters have to be captured with a specific accuracy on a variable to be mapped. Even modern engine management systems quickly reach their limits in this case. In particular, the storage and computing capacity of the engine management system is quickly exhausted, so that finally compromises have to be made and limits placed with regard to accuracy. A similar approach applies for the sensor systems used in the spark-ignition engine, because large series products demand inexpensive components for which a certain measuring tolerance has to be accepted.

SUMMARY OF THE INVENTION

The object of this invention is therefore to provide a method for optimizing a valve-lift changeover on spark-ignition engines that is characterized by torque neutrality of the spark-ignition engine during valve-lift changeover processes and by an economic feasibility.

The above object is achieved by a method according to the claims.

With this method, the changeover inaccuracy during valve-lift changeover processes is reduced for individual systems and the quality of the changeover process is improved. The process according to the invention deals with inaccuracies arising from the manufacturing process while at the same time detecting long-term changes in the spark-ignition engine and minimizing their effect. Advantageous embodiments and developments of this invention are given in the following description, the accompanying illustrations and the appended claims.

The method according to the invention for optimizing a valve-lift changeover on spark-ignition engines with lambda control consists of the following steps: acquisition of engine operating data, preferably data relevant to torque, during the valve-lift changeover and application of the operating data to an engine management system, evaluation of an acceleration characteristic of the valve-lift changeover as a measure of the quality of the valve-lift changeover and evaluation of a lambda characteristic of the valve-lift changeover so that if there is an irregularity in the acceleration characteristic a calculation of a cylinder charging and/or a calculation of a torque can be corrected.

This method for spark-ignition engines with lambda control is based on the engine operating data, mainly acquired as standard, that is transferred to the engine management system of the spark-ignition engine. Using this engine operating data, "jerky running" of the motor vehicle during the valve-lift changeover can be detected, because this "jerky running" is caused by an irregularity in the acceleration characteristic of the spark-ignition engine. If the lambda characteristic during the valve-lift changeover is then assessed, inferences with respect to possible errors in the calculation of the cylinder charging of the spark-ignition engine and/or in the calculation of the torque of the spark-ignition engine can be drawn. The aforementioned irregularity in the acceleration characteristic of the valve-lift changeover provides a measure of the quality of the changeover process. If the torque of the spark-ignition engine remains constant, i.e. no irregularity occurs during the valve-lift changeover, there are no errors in the calculation models of the engine management system. If, however, the irregularity is very pronounced when various valve-lift changeover processes are compared, a graduated classification of the quality of the valve-lift changeover, and thus of errors in the cylinder charging and/or torque, can be made, in order to subsequently rectify same.

According to one embodiment, a segment time of the spark-ignition engine based on a crankshaft signal is evaluated to determine the irregularity in the acceleration characteristic as a measure of the quality of the valve-lift changeover. This step is preferably supplemented in that the lambda characteristic is used to determine whether an enriching or leaning or a constant lambda characteristic is present. If an enriching or leaning is detected in this context, the quality provides evidence of an error in the calculation of the cylinder charging. If on the other hand a constant lambda characteristic is found and is accompanied at the same time by an irregularity in the acceleration characteristic, this points to an error in the calculation of the torque of the spark-ignition engine. If these faults, or some of these faults are found, a corrected cylinder charging and/or corrected torque of the spark-ignition engine is calculated.

According to a further embodiment of this method, the engine operating data of the valve-lift changeover and the corrected cylinder charging and/or corrected torque are entered in a database as a correction value. A correction map for holding the above values is, for example, suitable as a database with a comparatively small data processing cost. A validity area around the correction value that extends through a plurality of operating states of the spark-ignition engine is preferably defined within this correction map. If overlapping validity areas of correction values are found, a mutual plausibilization of these validity areas takes place. As part of this process, overlapping validity areas are combined with matching correction values, whereas overlapping validity areas with non-matching correction values are reduced, to preclude an overlap.

BRIEF DESCRIPTION OF THE DRAWINGS

Preferred embodiments of the invention are explained in more detail with reference to the accompanying drawing:

FIG. 1A—the drawing shows a flow diagram for a system-specific optimization of the valve-lift changeover of a spark-ignition engine, FIG. 1B—the drawing further shows a flow diagram for the optimization of the valve-lift changeover of a spark-ignition engine.

DETAILED DESCRIPTION OF THE INVENTION

On present-day spark-ignition engines with lambda control, a valve-lift changeover takes place between two or more different inlet and/or outlet valve lifts. During the valve-lift changeover, the engine management system records all variables relevant to torque. These, for example, are air mass MAF, inlet manifold pressure MAP, lambda characteristic LAM, speed characteristic CRK, throttle valve angle TPS, ignition angle IGA, intake air temperature TIA, coolant temperature TCO, oil temperature TOIL, injection characteristic TI, torque characteristic TQ, TQI, TQ_LOSS, camshaft position CAM_IN, CAM_EX and the swirl valve position PORT_FLAP. During the valve-lift changeover, the crankshaft signal is preferably detected and evaluated, as shown in the flow diagram in Part A of the illustration. The measured lambda is evaluated at the same time. During the evaluation, the engine management system determines whether the lambda value of the spark-ignition engine has remained constant or there has been an enriching or leaning due to the valve-lift changeover. The result of the evaluation is then available to the engine management system for the ongoing process.

If the valve-lift changeover process is less than optimum, a "jerky running" of the motor vehicle takes place, that is perceived by the occupants as intrusive. From a physical point of view, "jerky running" is an irregularity in the acceleration characteristic of the motor vehicle and can be calculated as a time derivation of the acceleration at a given movement sequence. From the point of view of measuring and computing, this can only be detected in the vehicle at high technical cost, so that in practice the use of the crankshaft signal (CRK) seems appropriate. From the crankshaft signal applied to the engine management system, the respective segment time or duration of a combustion cycle of the spark-ignition engine can be determined, from which the acceleration characteristic can be established.

In order to now be able to evaluate the valve-lift changeover, the segment times determined from the crankshaft signal are analyzed and evaluated, and from this the quality of the valve-lift changeover is derived. A measure of the quality of the valve-lift changeover is the aforementioned irregularity in the acceleration characteristic at the time point of the valve-lift changeover. The irregularity in the acceleration characteristic or quality of the valve-lift changeover is classified on the basis of known fuzzy rules. The categories of the classification are chosen as follows, but of course other classifications are conceivable. 1=no jerky running, 2=slight jerky running, 3=strong jerky running, 4=unacceptable jerky running.

The results of the evaluation of the acceleration characteristic during the valve-lift changeover are then assessed in conjunction with the acquired lambda characteristic. With the precondition that a plausible lambda characteristic was observed during the valve-lift changeover, the quality of the changeover can be used as a measure of an existing fault in the calculation of the cylinder charging. A plausible lambda characteristic during the valve-lift changeover would be a leaning or enriching of the mixture. If this process indicates a charging error (see illustration, part A), then in a next step, the pilot value for the cylinder charging (MAF_SP=set point of the cylinder charging) is corrected and thus matched.

The correction or matching of the cylinder charging values is carried out with respect to various criteria and preferably in stages. These criteria are, for example, the quality of the valve-lift changeover and the lambda characteristic during the valve-lift changeover. In this context, a leaning or enriching is an indicator of too much or too little cylinder charging respectively. A further criterion is the estimation of the need for a feedback control by the engine management system. In this connection, it is to be determined whether the error was so large that an acute remedy must be provided. If only a slight "jerky running" was detected, a further valve-lift changeover in this map area can be awaited, to make sure that the decision is sound. A further criterion is directed to the action range of the adaptation, i.e. in which map area the correction is to take place. Furthermore, the relationship between the above correction and the operating point of the spark-ignition engine is to be assessed, e.g. ΔMAF/MAF with ΔMAF=charging error.

If a cylinder charging error was detected, it can be compensated for by various correcting variables. The main correcting element in this respect is the throttle valve, with it also being possible to influence the cylinder charging by adjusting the charge cycle timing, for example by means of camshaft phase correcting elements in the form of particularly fast electrical correcting elements that influence the cylinder charging.

If the lambda characteristic during the valve-lift changeover phase shows no indication of enriching or leaning, an error is present in the torque model (TQI_SP=torque set point). In this case the torque set point TQI_SP is to be corrected by a specific amount ΔTQI and adapted. In a manner similar to the correction of the cylinder charging described above, various criteria are also used to correct the torque model, in order to perform a quantification of the torque error, preferably in stages. These criteria include the quality of the valve-lift changeover, an estimation of the requirement for a correction, the action range of the adaptation and the relationship to the operating point ΔTQI/TQI. In addition to the translation of the determined correction values for the cylinder charging and the torque model by the engine management system, these correction values are stored in a database together with the aforementioned operating variables of the spark-ignition engine. On this basis, this database contains the operating conditions of the valve-lift changeover and the corresponding determined correction for cylinder charging and the torque model, so that the operation of the spark-ignition engine can be further optimized on the basis of this data. The database is preferably formed by a correction map. At the next valve changeover, the required engine operating variables can then be taken from this correction map together with the new pilot values or correction values in conjunction with the particular changeover conditions.

Because databases in engine management systems can be realized only at great cost, a storage and mutual plausibilization of the correction values or adaptation values is carried out using fuzzy rules. The relevant valve switching range is first outlined, i.e. the range is delineated in which a valve-lift changeover can only take place. The determining variable in this case is the torque TQI. If a correction value corresponding to the above description is determined for a valve changeover, the value is entered in the correction map at its operating point place specified by the operating data of the spark-ignition engine. Furthermore, a validity area is particularly defined as a circular area, also called a cloud, in which the correction value also has validity. This validity area extends over a plurality of operating states of the spark-ignition engine that are characterized by the above variables. If valve changeovers take place in the direct vicinity of the operating point of the previously determined correction value, the same correction value for cylinder charging and torque is used on the basis of the defined validity area.

The number of correction values not temporarily stored in the above correction map, together with the correspondingly defined validity areas, increases with increasing operating time.

Due to the plurality of correction values and validity areas or clouds, cloud boundaries collide, i.e. cut-sets form between the clouds of different correction values. If such cut-sets form, a mutual plausibilization of the overlapping validity areas of different correction values takes place as seen in FIG. 1B. If the mutual plausibilization shows that correction values stored in the correction map match, the validity areas are combined to form a common range or common cloud. A combined set of these validity areas is thus formed. If the correction values of the overlapping validity areas do not agree, the cloud size of both clouds or of validity areas in question is reduced until there is no overlap. In this way, there is a differentiation when considering the affected area during further valve changeover operations. The size of the validity areas or clouds is defined according to the aforementioned criteria of the correction value determination.

The main advantage of the method is that system-specific inadequacies during the valve-lift changeover are detected and rectified. Furthermore, a distinction is made between cylinder charging errors and torque model errors. A torque neutral and jerk-free valve-lift changeover is permanently achieved in all valve-lift changeover areas, thus increasing the comfort of the motor vehicle. Due to the non-volatile storage of the correction or adaptation values, a specific changeover performance is guaranteed with this adaptation method that lasts over the complete service life of the vehicle regardless of the previous history of the engine. Furthermore, values already present in the correction map are adapted to cater for signs of ageing of the engine and are therefore completely up to date.

The invention claimed is:

1. A method for optimizing a valve-lift changeover of a spark-ignition engine having lambda control, comprising:
    acquiring torque-relevant engine operating data during the valve-lift changeover;
    transferring the operating data to an engine management system;
    determining an acceleration characteristic based on the operating data;
    evaluating the acceleration characteristic as a measure of a quality of the valve-lift changeover;
    determining if an irregularity of the acceleration characteristic has occurred; and
    evaluating a lambda characteristic of the valve-lift changeover by correcting a cylinder charging calculation or a torque calculation if an acceleration characteristic irregularity is determined,
    wherein the irregularity in the acceleration characteristic is determined by evaluating a segment time based on a crankshaft signal,
    wherein the lambda characteristic represents an enriching, a leaning or a constant value, and
    wherein applying the quality of the valve-lift changeover as a measure of an error in the calculation of the cylinder charging and calculating a corrected cylinder charging if enriching or leaning has been detected.

2. The method as claimed in claim 1, further comprising applying the quality of the valve-lift changeover as a measure of an error in the calculation of the torque and calculation of a corrected torque if the constant lambda characteristic has been detected.

3. The method as claimed in claim 2, further comprising entering the engine operating data of the valve-lift changeover of the corrected cylinder charging or the corrected torque as a correction map value in a database.

4. The method as claimed in claim 3, further comprising defining a validity area around the correction value in the correction map that extends over a plurality of operating states of the spark-ignition engine.

5. The method as claimed in claim 4, further comprising combining overlapping validity areas if there are matching correction values of overlapping validity areas or reducing the validity areas to preclude an overlapping if the correction values are not matching.

* * * * *